(12) United States Patent
Khitrik et al.

(10) Patent No.: US 6,881,243 B1
(45) Date of Patent: Apr. 19, 2005

(54) METHOD FOR REMOVING ACIDIC GASES FROM WASTE GAS

(75) Inventors: Adolf Khitrik, Katzrin (IL); Gregori Pipko, Kazrin (IL); Benjamin Doron, Jerusalem (IL)

(73) Assignee: Lextran Ltd., Katzrin (IL)

( * ) Notice: Subject to any disclaimer, the term of this patent is extended or adjusted under 35 U.S.C. 154(b) by 130 days.

(21) Appl. No.: 10/110,311

(22) PCT Filed: Oct. 6, 2000

(86) PCT No.: PCT/IL00/00632

§ 371 (c)(1),
(2), (4) Date: Aug. 13, 2002

(87) PCT Pub. No.: WO01/26784

PCT Pub. Date: Apr. 19, 2001

(30) Foreign Application Priority Data

Dec. 10, 1999 (IL) .................................................. 132347

(51) Int. Cl.⁷ .............................................. B01D 53/14
(52) U.S. Cl. .............................. 95/188; 95/190; 95/206; 95/232; 95/235; 423/235; 423/242.2; 423/243.01; 423/243.03
(58) Field of Search .......................... 95/188, 189, 190, 95/197, 205, 206, 235, 232; 423/235, 242.1, 242.2, 243.01, 243.03, 243.06

(56) References Cited

U.S. PATENT DOCUMENTS

| | | | |
|---|---|---|---|
| 3,607,004 A | | 9/1971 | Deachamps et al. |
| 3,784,478 A | | 1/1974 | Kolak et al. |
| 4,039,304 A | * | 8/1977 | Bechthold et al. .............. 95/66 |
| 4,140,651 A | * | 2/1979 | Burnell et al. ......... 252/188.21 |
| 4,418,044 A | | 11/1983 | Kulik |
| 4,885,146 A | | 12/1989 | Lassmann et al. |
| 4,923,688 A | * | 5/1990 | Iannicelli .................... 423/224 |
| 5,433,934 A | * | 7/1995 | Chang et al. ................ 423/235 |
| 5,601,632 A | * | 2/1997 | Jensen .......................... 75/743 |
| 6,187,277 B1 | * | 2/2001 | Kirschner ................... 423/220 |

OTHER PUBLICATIONS

SU 602, 212 A Abstract, Mar. 15, 1978, Nikitin Yu E.

SU 606 606 A Abstract, Apr. 12, 1978, As Bashkir BR Chen.

* cited by examiner

*Primary Examiner*—Duane S. Smith
(74) *Attorney, Agent, or Firm*—Lowe, Hauptman, Gilman & Berner, LLP.

(57) ABSTRACT

A method for removing acidic gases from waste gases is disclosed. The invention relates to a method for removing acid gases, in particular from $SO_2$ and $NO_x$, by contacting the waste gas with an emulsion of water in organic sulfoxides, in particular of water in oil-derived-sulfoxides. The organic sulfoxide phase can be regenerated after the emulsion is loaded with polluants, by letting the emulsion to settle down and separate into two phases. The aqueous phase obtained after the separation contains sulfate and nitrate ions which can be collected and used as valuable chemicals.

14 Claims, No Drawings

METHOD FOR REMOVING ACIDIC GASES FROM WASTE GAS

FIELD OF THE INVENTION

The present invention relates to a method for removing acidic gases from waste gases. More specifically the present invention relates to a method for removing acid gases, in particular from $SO_2$ and $NO_x$, by contacting the waste gas with an emulsion of water in organic sulfoxides, in particular of water in oil-derived-sulfoxides. The organic sulfoxide phase can be regenerated after the emulsion is loaded with pollutants, by letting the emulsion to settle down and separate into two phases. The aqueous phase obtained after the separation contains sulfate and nitrate ions which can be collected and used as valuable chemicals.

BACKGROUND

Industrially developed countries generate billions of tons of air pollutants, a great part accounts to the combustion of coal, oil, and gasoline in electric power plants. Other major air pollution sources include petroleum refineries, cement plants and petrochemical plants.

Among the most troublesome air pollutants emitted into the atmosphere are acid gases and in particular $SO_2$ and $NO_x$. These gases are the major cause for acid rain, for smog and for human discomfort and disability. Sulfur dioxide is released into the atmosphere from the combustion of sulfur containing compounds in fossil fuels, such as gas, petroleum, and coal. $SO_2$, is a heavy, colorless gas with a characteristic, suffocating odor. In moist air it is slowly oxidized to sulfuric acid and contributes to acid rain. $NO_x$ gases, on the other hand, partly originate from the combustion of nitrogen containing compounds but mostly they originate from the reaction between elementary oxygen and nitrogen present in the air at the elevated temperatures at which various industrial processes (and combustion) take place. Therefore, the problem of $NO_x$ is even more difficult to overcome as it is a problem inherent to these processes and its generation cannot be avoided. Nitrogen oxides, in addition to their contribution to acid rain, breaks down to form ozone and reacts with other atmospheric pollutants to form photochemical smog which irritates sensitive membranes and damages plants.

The increasing environmental awareness during the last decades has led in many countries to governmental regulations, enforcing standards for maximum air pollutants emission on power plants and industries, in order to achieve air quality standards for various hazard materials. For example, in the U.S., the Clean Air Act of 1967 as amended in 1970, 1977, and 1990 is the legal basis for air-pollution control throughout the U.S. The 1990 amendments to the Clean Air Act of 1967 put in place regulations to reduce the release of sulfur dioxide from power plants to 10 million tons per year by Jan. 1, 2000. This amount is about one-half the emissions of 1990. In 1988, as part of the United Nations-sponsored Long-Range Transboundary Air Pollution Agreement, the United States, along with 24 other nations, ratified a protocol freezing the rate of nitrogen oxides emissions at 1987 levels.

The need to obey these regulations has led to the development of diversified methods for controlling and reducing the emission of air pollutants. In general, these methods include removing the hazardous material before it is used (for example, using low-content sulfur coal) or removing the pollutant after it is formed. For some air pollutants, (e.g., $NO_x$) only methods of the second class can be employed.

The present invention relates to methods of the second class.

Industrially emitted pollutant gases can be entrapped by liquids or solids traps that adsorb the harmful gases before they are released into the atmosphere. These traps are usually in the form of tower tanks contactors through which the waste gas is passed upward while the liquid, or a slurry, i.e. a mixture of liquids and solids, is descending downward. The agent which absorbs the pollutants and prevent their emitting into the atmosphere is called the scrubbing agent. When this agent is a liquid, it is sometimes the practice to fill the tower with inert particles in order to increase the contact surface between the scrubbing agent and the waste gas and to increase the residence time of the gas inside the reactor. In such cases it is also the practice to circulate the liquid scrubbing agent through the reactor until it is loaded with the pollutants.

Wet flue gas desulfurization, i.e., the removal of $SO_2$ processes typically involve the use of an alkaline cleansing liquid, such as a calcium-based slurry or a sodium-based or ammonia-based solution. These processes however are not suitable for the removal of nitrogen oxides. The currently used methods for the removal of $NO_x$ from flue gas are mainly of the king that is based on the reaction of NO and $NO_2$ with ammonia, with or without a catalyst, forming nitrogen and water. These methods are effective only within a narrow flue gas temperature range, are relatively high cost and involve the risk of ammonia leakage to the atmosphere. In the presence of catalyst the process is more efficient but its cost is even higher and the catalyst tends to be poisoned. In any case these methods require a special equipment useful only for the removal of $NO_x$.

U.S. Pat. No. 3,6707,004 discloses a process for removing traces of hydrogen sulfide ($H_2S$) contained in gases. The process consists of passing the hydrogen sulfide-containing gas through a liquid phase consisting essentially of iodine dissolved in an organic solvent.

U.S. Pat. No. 3,784,478 teaches a process for removal of nitrogen oxides from the gaseous effluents of combustion processes utilizing gas-liquid absorption.

Russian patent No. 2099789 describes a process for removing sulphur dioxide from gasses by absorption with sulphoxides.

The processes described in U.S. Pat. Nos. 3,6707,004, 3,784,478 and Russian patent No. 2099789 are disadvantageous since by these processes only one gas ($NO_x$ or $SO_2$ or $H_2O$) can be removed from waste gases.

Therefore a great effort is put into developing new $NO_x$ control methods which will remove simultaneously $NO_2$ and $SO_2$ from combustion flue gas. For example, U.S. Pat. No. 4,418,044 teaches a scrubbing agent consisting of a solution of Fe(II) ions and thiosulfate in a miscible mixture of water and alcohol. U.S. Pat. No. 4,885,146 teaches a similar scrubbing agent consisting of Fe(II) ions but in non-aqueous solvent (only up to 10% water). According to U.S. Pat. No. 4,885,146 the scrubbing agent can be regenerated for reuse.

The cost of pollution reduction processes and equipment is, however, still very high and therefore intensive efforts are put into research in order to increase the efficiency of known processes and in order to find new more efficient and less energy consuming methods. These efforts concentrate on the following points: simplicity of process (i.e., involve low-cost equipment), the use of low-cost materials and the recycling of these materials, universality of process, i.e., removing as many pollutants as possible by the same process. Other, no less important, efforts are dedicated to finding processes in which the end products, not only are harmful, but can also be collected and be sold as useful materials (i.e., converting the harmful air pollutants into valuable materials) so that at least part of the investment will be earned back.

Therefore there is still a need for developing simple, more efficient and relatively low-cost, methods for air pollution control, especially methods which will clean fuel gases from both $SO_2$ and $NO_x$ simultaneously in one process and with the same equipment.

It is the aim of the present invention to provide a method for removing acid gases, in particular $SO_2$ and $NO_x$, simultaneously.

Yet it is another aim of the present invention to provide such a method which involves low-cost materials and equipment.

It is yet another aim of the present invention to provide such a method in which the scrubbing material is regenerated easily for further use.

It is another aim of the present invention to provide such a method which will also results in conversing the $SO_2$ and $NO_x$ into useful materials with commercial value.

SUMMARY OF THE INVENTION

The present invention relates to a method for removing acidic gases, in particular $SO_2$ and $NO_x$, from waste gases by contacting the waste gas with an emulsion of water-in-organic sulfoxides. The waste gas can be any waste gas containing acidic gases, such as combustion flue gas and waste gases generated in various chemical processes. The organic sulfoxides are preferably oil-derived sulfoxides and in particular sulfoxides derived from diesel. The weight ratio of the water: organic sulfoxide in the emulsion is in the range 10:90 to 90:10, preferably in the range 10:90 to 50:50.

The process of the present invention is carried out in an oxidation environment. Therefore if the waste gas mixture does not contain enough oxygen, an additional stream of air enriched with ozone (ozonated air) is added to the waste gas.

The scrubbing agent can be regenerated after it is loaded, by letting said scrubbing agent to separate into two phases, collecting the upper sulfoxide phase and adding to said sulfoxide phase a fresh amount of aqueous solution The aqueous phase which is obtained after the separation of phases contains nitric and/or sulfuric acids and can be collected to be used as useful acid solutions or ammonium ions can be added acidic solution until neutralization occurs to obtain a solution of ammonium nitrate and/or ammonium sulfate salts useful as a fertilizer.

In another embodiment of the present invention the aqueous phase of the scrubbing agent is an aqueous solution of ammonium having pH equals or lower than 6 and after the separation of the emulsion the aqueous phase is a solution of ammonium nitrate and/or ammonium sulfate salts useful as a fertilizer. The source for the ammonium ions can be ammonia or ammonium carbonates (and bicarbonates) and ammonium carbamate.

According to the present invention, contacting the waste gas with the scrubbing agent can be conducted in a tower embedded with inert particles, wherein the waste gas is passed upward through the tower and the emulsion is circulated downward in a rate which ensures complete wetting of inert particles or can be conducted in a tower through which the waste gas is passed in an upward direction and the emulsion is sprayed into the tower from the upper opening of the tower forming a fog of said emulsion inside the tower.

DETAILED DESCRIPTION OF THE INVENTION

The main problem of entrapping acid gases in aqueous solutions is the instability of the intermediate species formed upon the dissolution of the acidic gases in water (e.g., $HNO_2$, $H_2SO_3$), before they are oxidized into stable species. The instability results in the decomposition of the species and the releasing of the noxious gases from the solution. The present invention overcomes this problem by introducing an agent which binds the unstable species and forms a stable complex. Upon oxidation, a stable ion is formed and the complex decomposes, leaving the agent molecules free to bind to new dissolved pollutant molecules.

According to the present invention, this stabilizing agents are organic sulfoxides. Organic sulfoxides are known for their acid extraction properties. Of special interest are oil derived sulfoxides that are obtained by the oxidation of organic sulfides contained in oil. By oxidizing and extracting different fractions of oil, a mixture of sulfoxides is obtained, having molecular weight and boiling temperature according to the oil fraction from which they are derived. The diesel fraction (boiling temperature 190–360° C.) is in particular a good source for oil-derived-sulfoxides, since this fraction is relatively rich in sulfur and the sulfoxide mixture so obtained is a liquid of low-cost.

Sulfoxides form a complex with the unstable dissolved acidic gases thus stabilizing these species and preventing their decomposition as explained in the following.

a. $NO_x$ Entrapping

The total concentration of $NO_x$ produced in combustion processes is typically 200–1000 ppm, most of it in the form of nitric oxide (NO) and about 5% as nitrogen dioxide ($NO_2$).

NO is a relatively inert gas. It does not dissolve in water and forms no chemical compound with water or with alkalis, therefore it cannot be absorbed by basic aqueous solutions. In order for NO to be absorbed by aqueous solutions, it needs to be oxidized first by oxygen or by ozone:

(1) $2NO+O_2 \rightarrow 2NO_2$ 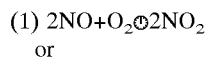

or (2) $NO+O_3 \rightarrow NO_2+O_2$ 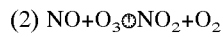

When both NO and $NO_2$ present in the gas mixture they react to give:

(3) $NO+NO_2 \rightarrow N_2O_3$ 

The interaction of NO and $NO_2$ with water occurs according to the following possible reaction routes:

(4) $2NO_2+H_2O \rightarrow HNO_2+HNO_3$ 

(5) $3HNO_2 \rightarrow HNO_3+2NO+H_2O$ 

(6) $3NO_2+H_2O \rightarrow 2HNO_3+NO$ 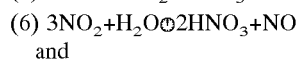

and (7) $N_2O_3+H_2O \rightarrow 2HNO_2$ 

(8) $3HNO_2 \rightarrow HNO_3+2NO+H_2O$ 

(9) $3N_2O_3+H_2O \rightarrow 2HNO_3+4NO$ 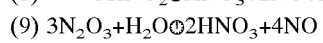

It is obvious from reactions (4–9) that in all cases, upon interaction of $NO_2$ (or NO and $NO_2$) with water, $HNO_2$ is formed and decomposed to give NO.

The present invention provides a way to avoid the decomposition of nitrous acid and the release of NO from the solution, by using organic sulfoxides, having the structure:

$$\overset{R}{\underset{R}{O=S:}}$$

The free electron pair on the sulfur atom forms a bond with $HNO_2$ (J. Applied Chemistry, vol 4, 1986, 900–903):

$$\overset{R}{\underset{R}{O=S:}} \overset{OH}{\underset{O}{:N}}$$

Thus, the sulfoxide binds the $HNO_2$ and its decomposition is prevented.

In the presence of oxidant, the bound nitrous acid is oxidized to nitric acid and loses its capability to bind to the sulfoxide. $HNO_3$, whose water solubility is very high, moves into the aqueous phase and the sulfoxide molecules can adsorb another molecule of nitrous acid.

b. $SO_2$ Entrapping

The combustion of coal, oil and other sulfur containing fuels produces a flue gas in which 98–99% of the sulfur is in the form of sulfur dioxide ($SO_2$) and 1–2% is sulfur trioxide ($SO_3$). For low and high sulfur coals the total concentration of $SO_x$ is usually in the range of 1,000–4,000 ppm.

$SO_2$ dissolved in water forms sulfurous acid:

(10) $SO_2 + H_2O \leftrightarrow H_2SO_3$

Sulfurous acid is unstable, it exists only in aqueous solutions and as the temperature increase the equilibrium of reaction (10) shifts to the left and $SO_2$ is released. The solubility of $SO_2$ in water is 9.61% at 20° C. and decreases with temperature. At 80° C. its solubility is only 2.98%.

In the presence of oxidants, sulfurous acid oxidized gradually to sulfuric acid. In the presence of ozone the $SO_2$ dissolved according to the following:

(11) $2SO_2 + O_3 + H_2O \leftrightarrow H_2S_2O_6 + O_2$ and the dithionic acid is decomposed according to:

(12) $H_2S_2O_6 \leftrightarrow SO_2 + H_2SO_4$

In the presence of $NO_x$ in water:

(13) $H_2SO_3 + NO_2 \leftrightarrow H_2SO_4 + NO$

And the formed NO is oxidized again to $NO_2$ and reaction (13) is repeated. Thus, NO acts as a catalyst, accelerating the oxidation of $SO_2$.

In the presence of sulfoxides, $SO_2$ forms a complex with the sulfoxide group. (Nieftiechimija vol. 18, No. 2 p. 325–327). Infra-red studies show that a 1:1 complex of sulfoxide with $SO_2$ is formed through coordination bond of the oxygen of the SO group with the free electron pair on the sulfur atom of the sulfur dioxide.

$$:O:\overset{**}{\underset{}{S}}=O:$$

Thus, using sulfoxides, simplifies and enhances the removing of sulfur dioxide from waste gases. Our studies show that in the presence of oil sulfoxide and water, $SO_2$ absorption is enhanced and the decomposition of $H_2SO_3$ to release $SO_2$ according to reaction 10 does not occur.

EXAMPLES

The following experiments demonstrate and clarify the present invention and do not intend to limit the scope of the invention by any way.

Example 1

A glass column of 400 mm height and 30 mm diameter was heated by an outer electric heater to 80° C. The glass column was filled with glass rings of 4 mm height and 4 mm diameter and with 100 g emulsion of water in diesel derived sulfoxides comprising of 30 g water in 70 g sulfoxides. A stream of air containing 1.9% (mass percent) $NO_2$ was bubbled continuously through the bottom of the column at a rate of 0.29 l/min for 42 hours continuously. About 75–90% of $NO_2$ was consumed.

After 42 hours, the liquid in the column was collected and separated into two phases. The concentration of nitric acid in the aqueous phase was 20.3 wt. %.

The amount of nitrous and nitric acid in the sulfoxide phase was determined by potentiometric titration in non-water medium and was found to be 21% of the total acid. In order to destroy the nitrous acid—sulfoxide complex, water were added to the organic phase and oxygen was bubbled into the liquid in order to oxidize all nitrous acid molecules, converting them into nitric ions which pass to the aqueous phase.

The sulfoxide phase obtained after the phase separation was combined with a fresh amount of water and reused as a scrubbing agent. After a large number of recycling the scrubbing agent by this procedure, no reduction in its absorption power was observed.

This experiment demonstrates that at concentration of more than 20% of nitric acid in the aqueous component of the emulsion, the scrubbing agent of the present invention still has capability of absorbing more pollutants.

Example 2

$SO_2$ absorption was conducted under the same conditions as in Experiment 1. $SO_2$ concentration in the input gas was 2000 ppm. The process was carried out for 42 hours during which more than 90% of $SO_2$ were absorbed without observing loss of absorption capability. The aqueous phase obtained at the end of the process contained only sulfuric acid. No sulfite ions ($SO_3$) were detected.

Example 3

$NO_2$ and $SO_2$ absorbtion was conducted simultaneously with the same reactor and emulsion composition as in Example 1 but at temperature of 20–25° C.

The concentration of $NO_2$ was 1000 ppm and that of $SO_2$ 800 ppm.

The process was carried out the for 8 hours continuously and during this time no reduction in the absorption capability of the scrubbing agent was observed. The average concentrations of $NO_2$ and $SO_2$ at the output were less <10 ppm and <2 ppm respectively.

The aqueous phase obtained after collecting and separating the emulsion contained a mixture of nitric and sulfuric acids.

Example 4

A stream of 1% NO diluted in $N_2$ (0.188 l/min) was combined with a stream of pure nitrogen (1.69 l/min) and a stream of ozonated air (2.2 l/min) and the gas mixture was passed through a two-section column reactor of 0.04 m diameter. Each section has a perforated disk on which a packed glass rings of 6 mm diameter and 6 mm height were placed. The height of the packed glass rings in each section was 0.38 m.

The gas mixture was passed upward through the bottom of the reactor and the scrubbing agent, oil-derived sulfoxide:water=70:30 (weight ratio) was supplied dropwise into the column from its upper opening obtaining complete and uniform wetting of the glass rings by the liquid. The scrubbing agent was circulated through the reactor The residence time of the gas in the reactor was 12 s.

The process was carried out for 29 hours.

The ozone was supplied into the reactor at a rate of 0.2 g/h, providing 40% of the molar amount required for complete oxidation of NO into $NO_2$. The oxidation took place in the reactor simultaneously with the absorption of $NO_2$ by the scrubbing agent.

The concentrations of NO and of $NO_2$ were measured by an automatic analyzer at the input and at the output of the reactor.

The average input concentrations were: 600 ppm NO and 20 ppm $NO_2$

The average output concentrations were: 7.2 ppm NO and 1 ppm $NO_2$

The average absorption of NO was 88% and of $NO_2$ 95%.

The calculated amount of NO passing through the reactor during 29 hours is 4.38 g (0.1 13 l/h×29 h=3.277 l=(30 g/mole×3.277 l)/(22.4 l/mole) ). Since only 88% of NO was absorbed, the calculated amount of $HNO_3$ that should have been formed in the aqueous phase is 7.6 g. The experimental result was 7.42 g, i.e., 97.6% yield.

Example 5

The removal of NO from the waste gas produced in a nitric acid production process was carried out in a glass reactor of 9.09 cm diameter. The reactor of 1 m height had a perforated plate at its bottom on which a packing of 9 mm diameter and 9 mm height glass rings had been placed. The packing layer volume was equal to 0.023 $m^3$.

The waste gas from the chemical process was supplied to the reactor at a rate of 9.7 l/min. Ozonated air was supplied to the reactor at a rate of 5 l/min by an ozonator with an output of 0.1 5 g ozone per hour, providing 40.5% of the stoichiometric amount required for full oxidation of NO into $NO_2$.

The absorbent (oil sulfoxide:water=70:30) was dosed into the reactor from its upper opening at a rate of of 1530 ml/h.

The residence time of the gas inside the reactor was 9.4 s.

The concentrations of NO and of $NO_2$, measured by an automatic analyzer at the input and at the output of the reactor were as follows:

average input concentrations: NO=300 ppm, $NO_2$=50 ppm average output concentrations: NO=40 ppm, $NO_2$=2 ppm NO absorption 87%, $NO_2$ absdorption 96%.

Under the same conditions, but without ozone supply, 187 ppm of NO and 4 ppm of $NO_2$ were detected at the output, i.e., the NO absorption was 37.7% and the $NO_2$ absorption was 92%.

Example 6

In order to receive a complex fertilizing—ammonium nitrate and ammonium sulfate mixture, the aqueous phase received after one of the tests was separated from the organic phase (oil sulfoxides) and neutralized by aqueous solution of ammonium according to the following procedure:

10.2 g of $NH_4OH$ solution with 13% $NH_3$ concentration were added on agitation to 30.0 g aqueous phase which contained 6.0% of $HNO_3$ and 6.0 g of $H_2SO_4$. After neutralization, the pH of the solution was equal to 6.5.

The obtained solution was boiled at 100° C. and the obtained mixture was dried out at 150° C. degrees, obtaining 4.46 g of salts mixture. The analysis of the salts mixture gived the following composition:

2.1 g of $NH_4NO_3$ (92% of theoretical yield) and 2.36g of $(NH_4)_2SO_4$ (97.5% of theoretical yield).

What is claimed is:

1. A method for simultaneously removing acidic gases of sulfur and nitrogen oxides from waste gas before it is emitted to the atmosphere by contacting said waste gas with a scrubbing agent comprising an emulsion of water in organic sulfoxides in the presence of a stream of air or of ozonated air.

2. A method according to claim 1 wherein the waste gas is a combustion flue gas.

3. A method according to claim 1 wherein the waste gas is a gas mixture released from a chemical process.

4. A method according to claim 1 wherein the organic sulfoxides are oil derived sulfoxides.

5. A method according to claim 4 wherein the oil derived sulfoxides are derived from the diesel fraction of oil.

6. A method according to claim 1 wherein the weight ratio of water:organic sulfoxide in the emulsion is in the range 10:90 to 90:10.

7. A method according to claim 1 wherein the scrubbing agent is regenerated after it is loaded, by letting said scrubbing agent to separate into two phases, collecting the upper sulfoxide phase and adding to said sulfoxide phase a fresh amount of aqueous solution.

8. A method according to claim 7 wherein the aqueous phase obtained after the separation of phases contains nitric and/or sulfuric acids and is collected to be used as useful acid solutions.

9. A method according to claim 8 wherein ammonium salts are added to the acid solution obtained after the separation of phases to obtain a solution of ammonium nitrate and/or ammonium sulfate useful as a fertilizer.

10. A method for cleaning fuel gas from acid gases according to claim 1 wherein an aqueous phase of the emulsion further contains ammonium ions and wherein a solution of ammonium nitrate and/or ammonium sulfate obtained after separation of the emulsion is collected to be used as a fertilizing solution.

11. A method according to claim 9 wherein the source for the ammonium ions is selected from the group consisting of ammonia, ammonium carbonates and ammonium carbamate.

12. A method according to claim 1 wherein contacting the waste gas with said scrubbing agent is conducted in a tower embedded with inert particles and wherein the waste gas is passed upward through the tower and the emulsion is circulated downward in a rate which ensures complete wetting of inert particles.

13. A method according to claim 1 wherein contacting the waste gas with said scrubbing agent is conducted in a tower through which the waste gas is passed in an upward direction and the emulsion is sprayed into the tower from the upper opening of the tower forming a fog of said emulsion inside the tower.

14. A method according to claim 6 wherein the weight ratio of water:organic sulfoxide in the emulsion is in the range of 10:90 to 50:50.

* * * * *